US007597373B2

(12) United States Patent
McAuliffe, Jr.

(10) Patent No.: US 7,597,373 B2
(45) Date of Patent: Oct. 6, 2009

(54) FLEXIBLE ADJUSTABLE CARGO AREA LINER FOR STATION WAGONS, MINIVANS AND SPORT UTILITY VEHICLES

(76) Inventor: John Joseph McAuliffe, Jr., 6680 Star Path, Columbia, MD (US) 21045

( * ) Notice: Subject to any disclaimer, the term of this patent is extended or adjusted under 35 U.S.C. 154(b) by 111 days.

(21) Appl. No.: 11/342,226

(22) Filed: Jan. 27, 2006

(65) Prior Publication Data

US 2006/0170237 A1 Aug. 3, 2006

Related U.S. Application Data

(60) Provisional application No. 60/647,722, filed on Jan. 28, 2005.

(51) Int. Cl.
*B60R 13/01* (2006.01)
(52) U.S. Cl. .................................... 296/39.1
(58) Field of Classification Search ............... 296/39.1
See application file for complete search history.

(56) References Cited

U.S. PATENT DOCUMENTS

| | | | | |
|---|---|---|---|---|
| 1,259,138 | A | * | 3/1918 | Sachs ........................ 296/39.1 |
| 2,911,253 | A | | 11/1959 | Dewey |
| 3,653,710 | A | * | 4/1972 | Barnard ..................... 296/39.1 |
| 4,765,671 | A | | 8/1988 | Allen |
| 4,789,574 | A | | 12/1988 | Selvey |
| 4,877,281 | A | | 10/1989 | Altmann |
| 5,060,361 | A | * | 10/1991 | Grimes ........................ 29/450 |
| 5,110,171 | A | * | 5/1992 | Anthony .................... 296/39.2 |
| 5,378,034 | A | * | 1/1995 | Nelsen ...................... 296/39.2 |
| 5,722,710 | A | | 3/1998 | Falciani |
| 5,806,816 | A | * | 9/1998 | Hull et al. ................. 248/205.6 |
| 5,806,909 | A | | 9/1998 | Wise |
| 6,131,983 | A | * | 10/2000 | Jackson .................... 296/39.2 |
| 6,206,443 | B1 | | 3/2001 | Konop et al. |
| 7,178,851 | B1 | * | 2/2007 | Gridley ..................... 296/39.1 |
| 7,219,944 | B2 | * | 5/2007 | Klotz et al. ............... 296/39.1 |
| 2004/0164579 | A1 | | 8/2004 | Sims |
| 2005/0218682 | A1 | * | 10/2005 | Klotz et al. ............... 296/39.1 |

* cited by examiner

*Primary Examiner*—H Gutman
(74) *Attorney, Agent, or Firm*—Ober / Kaler; Royal W. Craig

(57) ABSTRACT

A flexible adjustable liner for station wagons, minivans and SUVs comprising a water-resistant material with sealed bottom, front and side sections to prevent spillage or leakage into the storage area, and a rear section that opens and closes with the tailgate or hatch door, thereby allowing cargo items to be easily placed onto or removed from the liner. The liner is suspended by an adjustable tether-support system. The adjustable support system comprises a system of cords that are attached along the ceiling or upper windows of the vehicle via a series of suction cups and/or the original equipment clothes hooks, conforming the liner to the entire storage area. The cords are adjustable in length and are set by spring-detent cinches to vary the coverage of the liner across the cargo area.

7 Claims, 4 Drawing Sheets

FLEXIBLE ADJUSTABLE CARGO AREA LINER FOR STATION WAGONS, MINIVANS AND SPORT UTILITY VEHICLES

CROSS REFERENCE TO RELATED APPLICATIONS

The present application derives priority from U.S. Provisional Patent Application 60/647,722, filed Jan. 28, 2005.

BACKGROUND OF THE INVENTION

1. Field of the Invention

The present invention relates to liners for vehicle storage areas and, more particularly, to a flexible adjustable liner for interior storage areas of station wagons, minivans and sports utility vehicles (SUVs).

2. Description of the Background

Conventional truck bed liners have long been used to protect the truck bed or its contents from the elements. Traditionally, conventional truck bed liners have been made of canvas, or other durable material, to withstand rain and other inclement weather. With the increasing popularity of sport utility vehicles (SUVs), there became an increasing need for cargo bed liners for a different purpose. Rather than protecting the exposed truck bed and/or contents from the elements, SUV cargo bed liners are necessary to protect the SUV interior from damage caused by the cargo being hauled. The same need arises in the context of station wagons and minivans. The interiors of SUVs, station wagons and minivans are made to be comfortable and attractive to the driver and passengers, and yet utilitarian for hauling cargo. Indeed, for many people, the attraction of an SUV is its ability to easily transform from a comfortable passenger vehicle to a vehicle that can haul equipment and other materials that do not fit into a standard vehicle. However, many SUV's have luxury interior features such as carpeting or leather, trundle seats, and other features that are otherwise left exposed when hauling cargo. Thus, there is a need for an easily-deployable liner to protect the interior cargo area of the SUV when filled with cargo rather than passengers. On the other hand, such a liner must be readily removable and/or stowable when passengers are present. Unlike exterior truck bed liners, SUV/station wagon/minivan cargo bed liners must serve multiple purposes: they should be water resistant, water tight, sturdy yet flexible, easily installed and removed, and capable of covering, without damaging, substantially the entire cargo storage area.

The general concept of an expandable cargo liner for SUVs is also well known, and has been implemented using a variety of different approaches and materials.

For example, U.S. Pat. No. 5,806,909 to Wise shows a removable bed liner comprising interattachable panels. The panels include a pair of side walls, a front wall, a back wall, and a floor. One or more of the panels may be selectively used at a time. Each of the panels is attached to the other panel by hook-and-loop fasteners or by zippers. The panels are removably attached to the vehicle cargo area by magnets, conventional fasteners such as screws, rivets, or snaps, or by hook-and-loop fasteners.

U.S. Pat. No. 5,722,710 to Falciani shows an expandable protective liner for vehicles with floor, opposing side walls, a tail gate portion, and a seat back portion. The liner is flexible and has bi-fold lines formed across each of the side panels and the planar member so that the side panels and planar member can be partially folded over one another to change the length of liner. The preferred material for the expandable liner is a heavy duty vinyl coated polyester fabric, and the side panels are formed with a plurality of eyelets. To secure the expandable protective liner to the rear cargo area of the vehicle, a plurality of suction cups with hooks are provided. Each of the suction cups is secured to the windows and hold the liner by its eyelets.

U.S. Pat. No. 4,789,574 to Selvey shows a removable protective liner for vehicles adapted to fit the rear bed of vehicles such as Blazers, Broncos, Cherokees, etc. The liner is formed of vinyl or naugahide and is attached by Velcro, mating snaps, or the like.

U.S. Pat. No. 4,765,671 to Allen shows a low modulus cargo bed liner, affixed to the vehicle's cargo bed by several Velcro-type fasteners, in which rigidified carpeting material is thermoformed into a floor covering piece, a tail gate covering piece, and two side covering pieces.

U.S. Pat. No. 2,911,253 to R. J. Dewey shows a trunk liner that uses a tongue-in-groove mounting system.

U.S. Patent Application No. 20040164579 by Sims, Earnest J. Jr. shows an automotive trunk hauling liner for protecting the finished surfaces of the cargo carrying area of a vehicle. The lining is formed of a puncture resistant protective sheet generally formed in the shape of the cargo carrying space. A variety of fastening devices around the periphery of the sheet are suggested to attach and hold it in place, including Velcro, clamps, adhesive tapes, magnets, buttons, buckles, zippers, snaps, cable, string, ropes, hooks, metal or other material even pins. It can also be installed with frames made of plastic, metal, wood, or other materials, that fit in the trunk. Also, this liner can be designed to fit the contour of a vehicle trunk or one size fits all, according to the style of vehicle.

U.S. Pat. No. 6,206,443 to Konop et al. shows a motor vehicle storage area liner divided into an integrally attached bottom panel, a back panel, two side panels, and a front panel. The back and front panels each include folding tabs with engage slots formed on the side panels to hold the back, front and side panels in a perpendicularly aligned position. Hook and loop connector strips may be used in place of the tabs and slots.

U.S. Pat. No. 4,877,281 to Altmann shows an interior cargo area liner having a floor, walls, a roof, and possible gate and/or rear cover. An opening is provided in the liner to allow easy access to the interior cargo area located within the liner. The opening of the liner may be closed by attaching the gate and/or rear cover.

Each of these prior art references offer a vehicle cargo bed liner with attachment means. However, none of these devices teach a flexible adjustable liner for station wagons, minivans and SUVs comprised of a water-resistant material with sealed bottom and side panels to prevent spillage or leakage into the storage area, that employs an adjustable tether-support system. It has been found that a suspension-type tether support system for a flexible adjustable liner is better capable of accommodating the various internal configurations of station wagons, minivans and SUVs in order to conform the liner to the entire storage area. This is accomplished herein by the adjustable liner of the present invention, which is suspended at its periphery by a system of cords that are attached to the sides of the vehicle. The cords are adjustable in length and are set by spring-detent cinches to vary the coverage of the liner across the cargo area.

SUMMARY OF THE INVENTION

It is, therefore, an object of the present invention to provide a flexible adjustable liner for station wagons, minivans and SUVs.

It is another object to provide a flexible adjustable liner for station wagons, minivans and SUVs that is durable and water-resistant.

It is yet another object to provide a flexible adjustable liner for station wagons, minivans and SUVs that prevents spillage or leakage into the storage area.

It is another object to provide a flexible adjustable liner for station wagons, minivans and SUVs that protects the storage area from damage from materials being hauled.

It is still another object to provide a flexible adjustable liner for station wagons, minivans and SUVs that employs a suspension-type system of cords that are adjustable in length and can be set by spring-detent cinches to vary the coverage of the liner across the entire cargo area.

It is another object to provide a flexible adjustable liner for station wagons, minivans and SUVs that is easy to install and remove, which efficiently and effectively attaches to the vehicle.

It is yet another object to provide a flexible adjustable liner for station wagons, minivans and SUVs that is economical and easy to manufacture.

It is still another object to provide a flexible adjustable liner for station wagons, minivans and SUVs that does not require any permanent attachment to the vehicle.

According to the present invention, the above-described and other objects are accomplished by providing a flexible adjustable liner for station wagons, minivans and SUVs comprising a water-resistant material with sealed bottom, front and side sections to prevent spillage or leakage into the storage area, and a rear section that opens and closes with the tailgate, or in the case of SUVs, the vertically rising hatch door, thereby allowing cargo items to be easily placed or removed from the liner, while protecting the inside surface of the closed tail gate/hatch door from the load, and protecting the rear bumper when loading debris. The liner is suspended by an adjustable tether-support adjustment system. The adjustable support system comprises a system of cords that are attached along the ceiling or upper windows of the vehicle, conforming the liner to the entire storage area. The cords are adjustable in length and are set by spring-detent cinches to vary the coverage of the liner across the cargo area. When the liner is removed from the vehicle, nothing remains in the vehicle; there are no permanently attached components.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a flexible adjustable liner system for station wagons, minivans and SUVs with a liner secured by an adjustable suspension-type mounting system that conforms the liner to the entire storage area. More specifically, the system includes an adjustable liner that is suspended at its periphery by a suspension-type network of cords that are attached to the sides and/or ceiling of the vehicle. The cords are adjustable in length and are set by spring-detent cinches to allow variation in the coverage of the liner across the cargo area.

Figure 1:
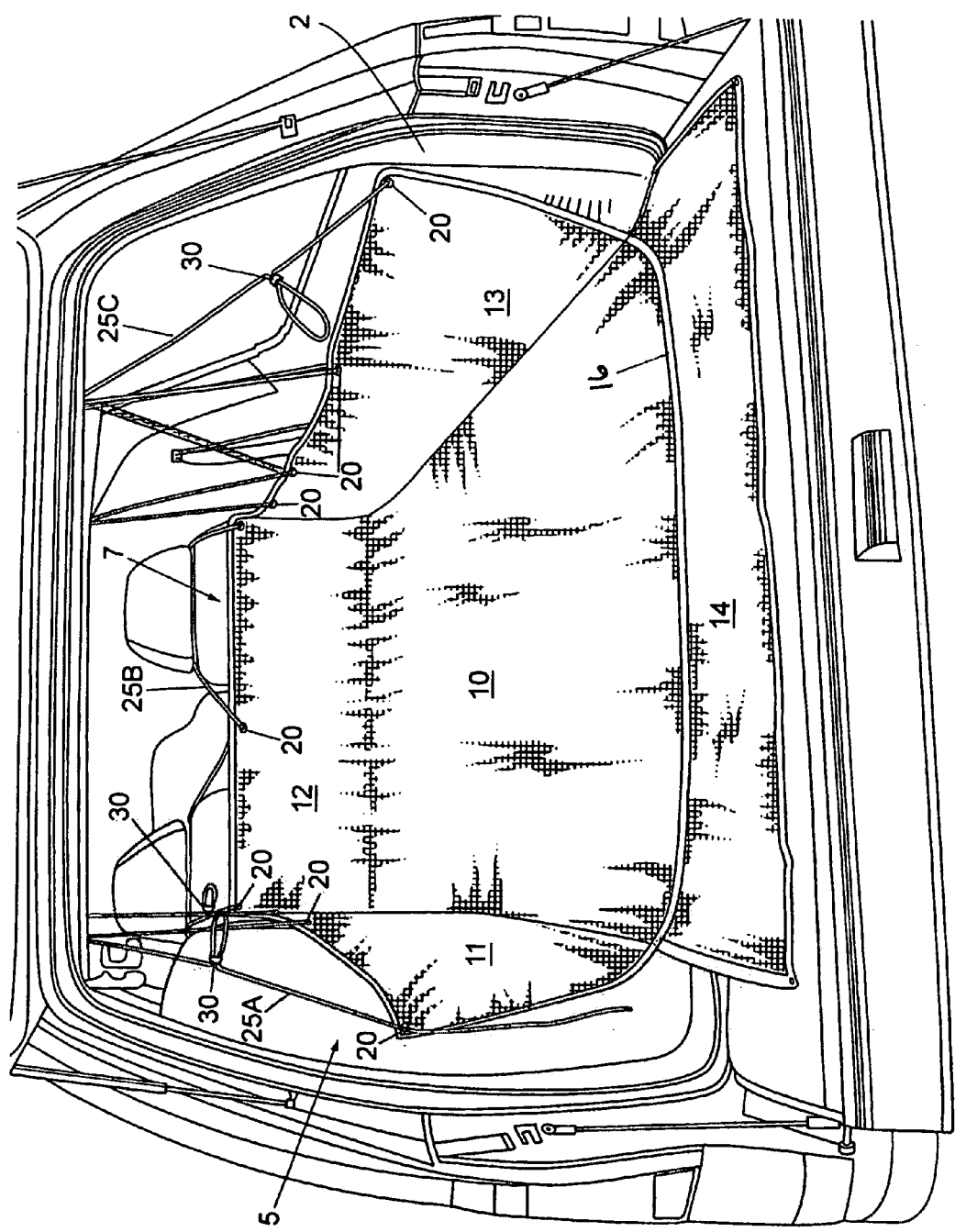
FIG. 1 is a rear perspective view of the flexible adjustable liner system 5 for station wagons, minivans and SUVs mounted in this case inside the cargo area of an SUV.

FIG. 1 is a rear perspective view of the flexible adjustable liner system 5 for station wagons, minivans and sport utility vehicles (SUVs) mounted in this case inside the cargo area of an SUV. The purpose of the flexible adjustable liner 5 is to protect the interior cargo area of the SUV (or station wagon, minivan, or the like), from wear and tear, spillage, etc. caused by refuse or cargo carried therein. Toward this end, the liner system 5 includes a flexible adjustable form-fitting liner 7 made of flexible durable water-resistant material, such as plastic or polyethylene sheeting. The size of liner 7 will vary depending upon the size of the vehicle with which it is used. The liner 7 is formfitting and may be cut from a rolled material blank to define a cross-shape including a center section 10 that extends horizontally across the interior cargo floor-space of the vehicle, a protruding left side panel 11 and a right side panel 13 extensible upward toward the windows on each side of the vehicle, and two protruding end sections 12 and 14. The rear end section 14 is dimensioned to extend over the vehicle hatch door or tailgate and is left free to fold up or down with the tailgate or hatch door. The front end section 12 extends upwards against the rear face of the middle row of seats, and is preferably sewn edge-to-edge to the corresponding left side panel 11 and a right side panel 13 creating sewn edge 15 to form a basin. The entire periphery of the liner 7 is folded over along the margins and is seamed to create a reinforced border 16.

The liner 7 is suspended at its periphery by a system of suspension cords 25 that are between the liner 7 and upper window area or ceiling of the SUV. Suspension cords 25 are connected to the liner 7 via a plurality of grommets 20 that are attached to the liner 7 around the periphery of side panels 11 and 13 and front end section 12. A total of thirteen (13) grommets 20 are presently preferred, five each along each side panel 11, 13 and three along the front end section 12. However, as few as nine grommets are required for the small version for smaller vehicles. Four of the grommets of each side panel 11, 13 support the upward suspension of the respective side panel and the end grommet closest to the front end section 12 of each side panel 11, 13 supports the front suspension of the front end section 12. The cord system 25 comprises three separate cords including left cord 25A, front cord 25B, and right cord 25C. The left and right cords 25A and 25C are elongate cords each fixedly attached at both upward suspension end-grommets 20 of the respective side sections 11, 13, and passed slidably through the intermediate grommets 20 to form a triple suspension on each side. All cords 25A-25C may be standard cotton or Nylon ⅛" cord.

Figure 2:
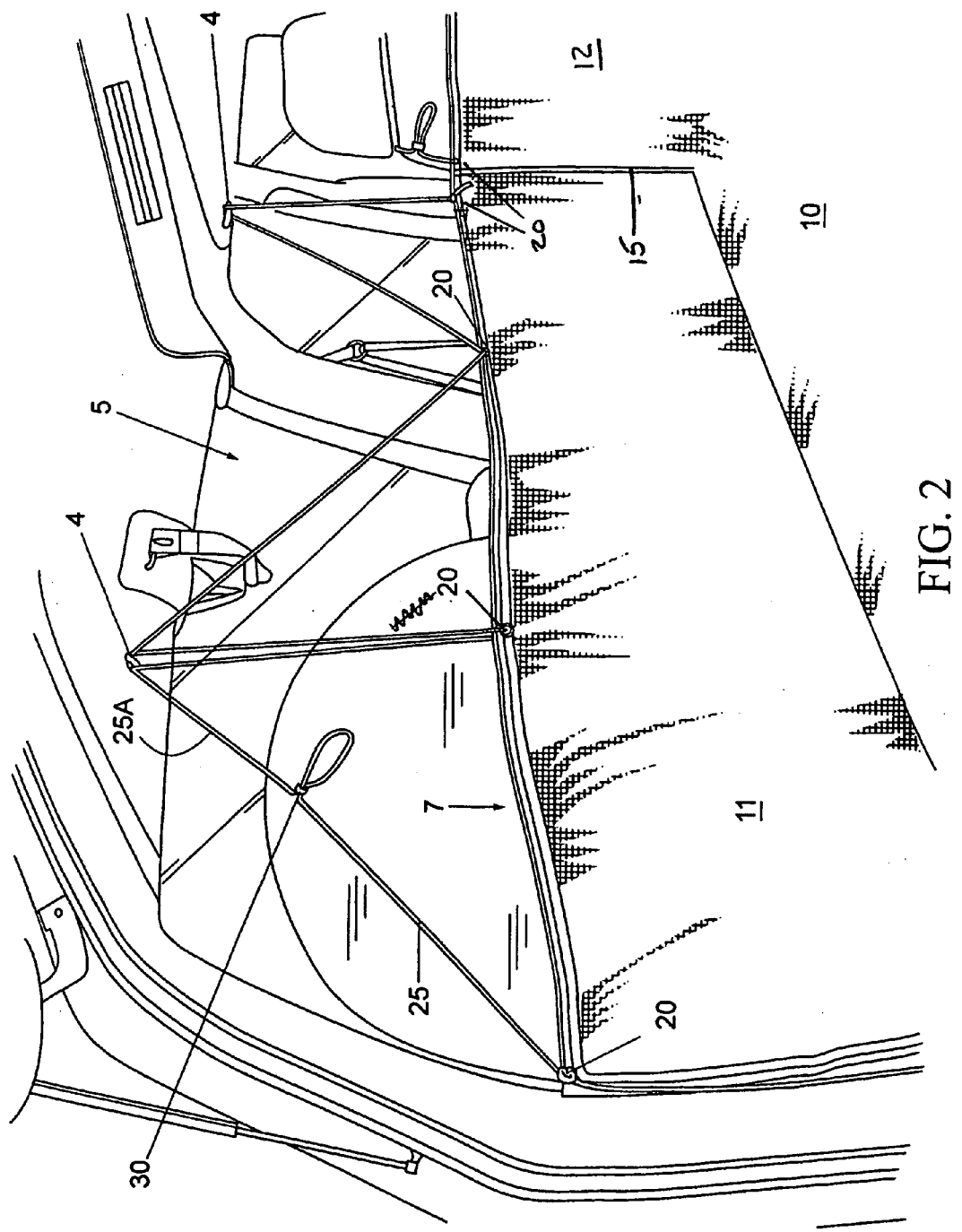
FIG. 2 is a side view of the flexible adjustable liner system 5 illustrating the side suspension configuration of FIG. 1.

FIG. 2 is a side view of the flexible adjustable liner system 5 illustrating the side suspension configuration. Each triple suspension (three per side seen on the left side as distinct triangles in FIG. 2, the right side being identical) comprises two rear triangles paired together to form opposing right triangles, and a front right triangle facing forward. The apices of the rear pair of opposing right triangles are slidably suspended from one of four common suspension hangars 4, two of which are mounted on each side along the upper window(s) or ceiling of the vehicle. The apex of the front right triangle is slidably suspended from a second suspension hangar 4 likewise mounted along the upper window(s) or ceiling of the vehicle. Typically, the four requisite suspension hangars 4 are provided as original equipment clothes hooks in most vehicles. However, as original equipment clothes hooks are not always present, four suction-cup hooks 4 are provided for upward mounting on the windows. Each suction cup is attached to the cord by means of a hole in its base. The cord runs freely through the hole so the tarp self levels.

Figure 3:
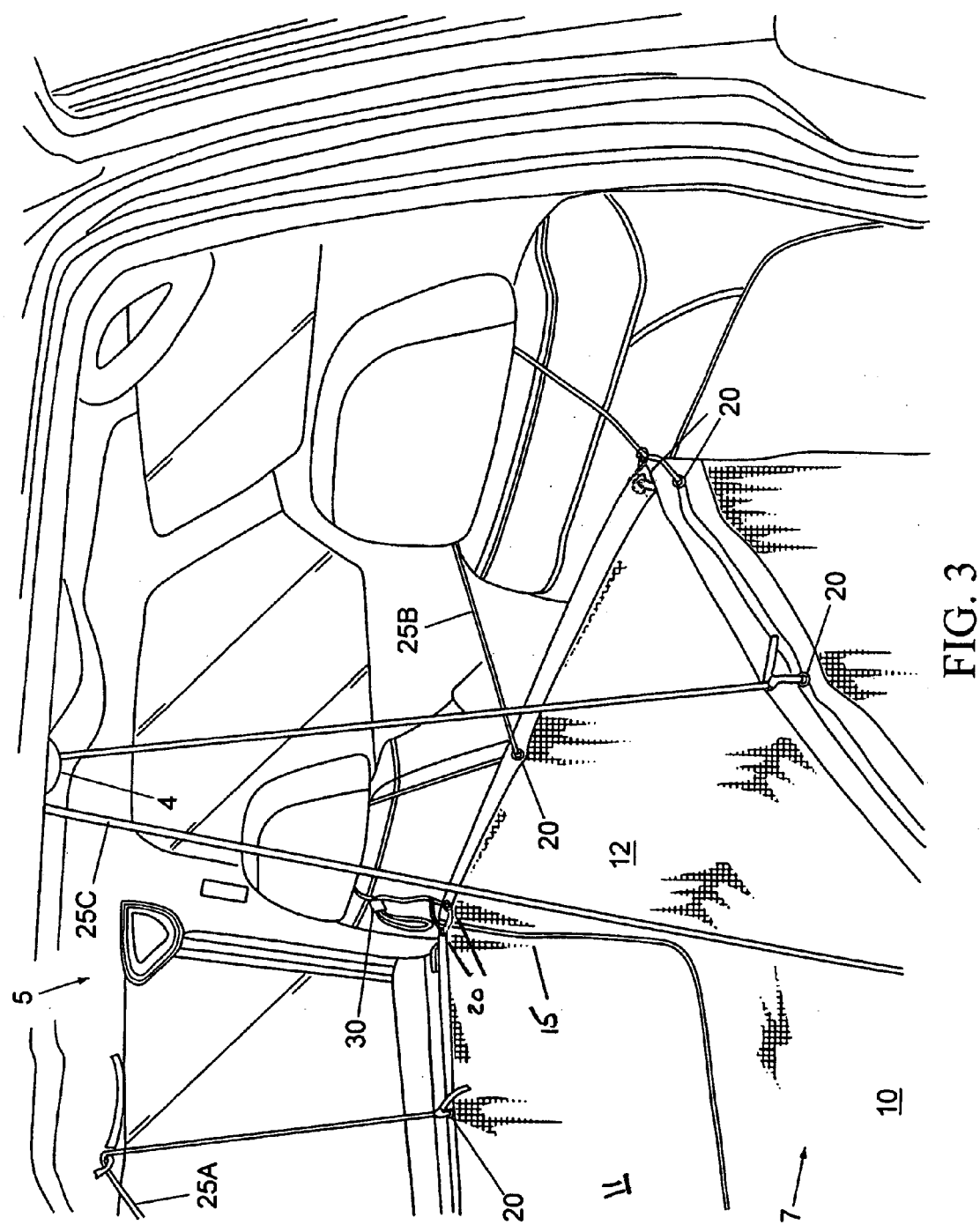
FIG. 3 is a top perspective view of the flexible adjustable liner system 5 illustrating the front suspension configuration of FIG. 1.
Figure 4:
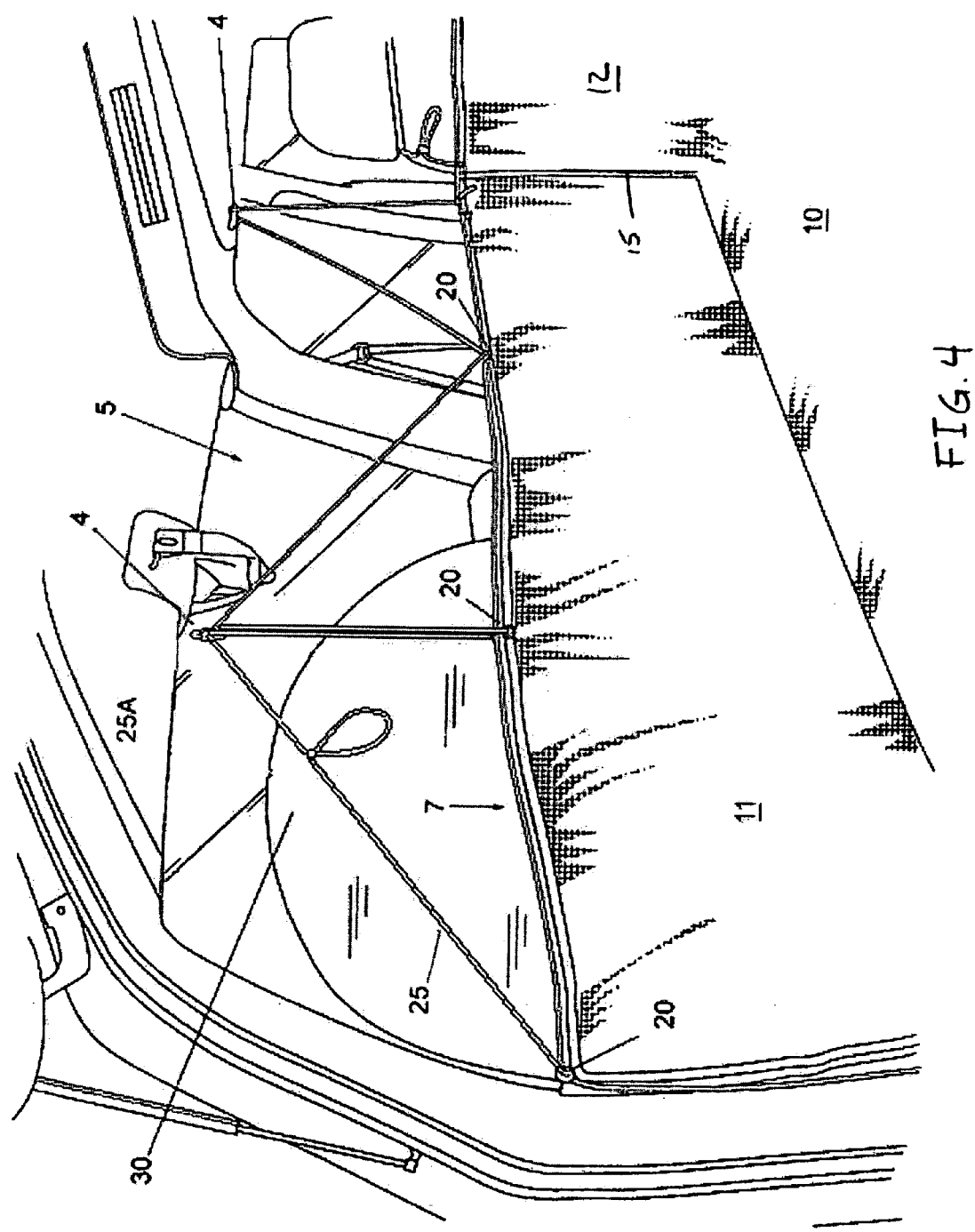
FIG. 4 is a side view of the flexible adjustable liner system 5 illustrating an alternate embodiment of the side suspension configuration of FIG. 1.

FIG. 3 is a top perspective view of the flexible adjustable liner system 5 illustrating the front suspension configuration. The front cord 25B is shorter than the side cords 25A and 25C, and is fixedly attached at an end-grommet 20 of the front section 12 and the upward suspension grommet of the side panel 11, passed around the headrest of the left front seat, passed around the headrest of the right front seat, and fixedly attached at an end-grommet 20 of the front section 12 and the upward suspension grommet of the side panel 13, to form a double suspension at the front section 12.

Referring back to FIG. 1, all three cords 25A-C are adjustable in length and this is readily accomplished by leaving a slack loop passed through a standard spring-detent cinch 30, the size of the loop being adjusted by cinch 30 to vary the coverage of the liner 7 across the cargo area. Each cinch 30 is tightened or released to relax or make taut the respective cord, which in turn adjusts the height, length and coverage of the liner 7.

To install the entire liner system 5 in a vehicle cargo area 2, the liner 7 is inserted into the cargo area as shown. The three cords 25A-C are each attached to an end grommet 20, and are threaded loosely as shown before being attached to the opposing end grommet 20. Each cord 25A-C is then tightened and looped over, the loop being set by insertion of a spring-detent cinch 30 over the loop. The loops/cinches 30 can then be adjusted as desired to conform the liner 7 to the particular cargo area. In this manner, the flexible adjustable liner system 5 protects the interior cargo area of the SUV, minivan or station wagon from any damage that may be caused by the materials being hauled. Moreover, the suspension-type mounting system inclusive of quadruple suspensions along the sides and double suspension at the front is extremely durable and resilient despite shifting cargo and stands up well to heavy loading. The system 5 is easy to install and remove (taking one minute or less), it efficiently and effectively attaches to the vehicle, and is economical and easy to manufacture.

Having now fully set forth the preferred embodiments and certain modifications of the concept underlying the present invention, various other embodiments of the lateral-mount lower tank as well as certain variations and modifications thereto may obviously occur to those skilled in the art upon becoming familiar with said underlying concept. For instance, additional grommets and/or cords may be employed. It is to be understood, therefore, that the invention may be practiced otherwise than as specifically set forth herein.

I claim:

1. A flexible adjustable liner for the cargo area of station wagons, minivans and sports utility vehicles, comprising:

a liner formed from a flat cross-shaped pattern of flexible water-resistant material and having a central rectangular floor section, two opposing upwardly-foldable side sections, an upwardly foldable rectangular front section, and a rectangular rear section, the side sections, front section and rear section all being joined along an edge to said central floor section to form a five-sided open-topped enclosure when said two side sections, front section and rear section are folded to an upward position, and a plurality of grommets spaced along an outer periphery of each of said side and front sections; and a cord system comprising at least three lengths of cord, including a first length of cord suspending one of said side sections in said upwardly-folded position from a plurality of suspension points spaced along a ceiling or side window on a corresponding side of said vehicle, said first length of cord being fixedly attached to one of said side section grommets, extending upwardly there from at an angle and slidably passing through one of said suspension points, extending downward there from and slidably passing through another of said side section grommets in a triangular configuration, extending upwardly there from and slidably passing through another of said suspension points, and extending downward there from and being fixedly attached to another of said side section grommets in a triangular configuration, thereby defining a multi-triangular suspension of said side section, a second length of cord similarly suspending the other of said side sections from a plurality of suspension points spaced along a ceiling or side window on an opposing side of said vehicle in a multi-triangular suspension, and a third length of cord suspending said front section in said upwardly-folded position from a plurality of vehicle headrests, said third length of cord being fixedly attached to one of said front section grommets, extending upwardly there from at an angle and slidably passing around one of said headrests, extending downward there from and slidably passing through another of said front section grommets, extending upwardly there from and slidably passing around another of said headrests, and extending downward there from and being fixedly attached to another of said front section grommets; and at least three spring detent cinches each applied to a corresponding one of said three lengths of cord, said cord lengths each being looped through the corresponding cinch to allow said three lengths of cord each to be adjusted in effective length by positioning and setting the spring-detent cinches along said loops;

whereby said liner is suspended peripherally by said suspension-cord system attached along the windows or ceiling of the vehicle to thereby conform said liner to the entire cargo storage area.

2. The flexible adjustable liner of claim 1, wherein said plurality of suspension points further comprise a plurality of suspension hangars mounted along the upper window or ceiling of the vehicle, the apices of the triangular-configured cords being laced through said plurality of suspension hangars.

3. The flexible adjustable liner of claim 1, wherein said liner comprises polyethylene.

4. The flexible adjustable liner of claim 1, wherein said cords comprise nylon cords.

5. The flexible adjustable liner of claim 1, wherein the periphery of said liner is folded over and seamed marginally to create a reinforced border.

6. A flexible adjustable liner for the cargo area of station wagons, minivans and sports utility vehicles, comprising:

a liner formed from flexible water-resistant material and having a central section, two upwardly-extending side sections, an upwardly extending front section, and a rear section, and a plurality of grommets spaced along the periphery of said side and front sections; and a cord system comprising at least three lengths of cord including a first length of cord suspending one of said side sections in said upwardly-extended position from a plurality of hooks mounted along a ceiling or side window on one side of said vehicle, said first length of cord being fixedly attached to one of said side section grommets, extending upwardly there from at an angle and slidably passing through one of said hooks, extending downward there from and slidably passing through another of said side section grommets in a triangular configuration, extending upwardly there from and slidably passing through another of said hooks, and extending downward there from and being fixedly attached to another of said side section grommets in a triangular configuration, thereby defining a multi-triangular suspension of said side section, and a second length of cord similarly suspending the other of said side sections from a plurality of hooks mounted along a ceiling or side window on an opposing side of said vehicle in a multi-triangular suspension;

whereby said liner is suspended at its periphery by said suspension-cord system attached along the windows or ceiling of the vehicle to thereby conform said liner to the entire cargo storage area.

7. A flexible adjustable liner for the cargo area of station wagons, minivans and sports utility vehicles, comprising:

a liner formed from flexible water-resistant material and having a central section, two upwardly-extending side sections, a front section, and a rear section, and a series of grommets spaced along the periphery of said side and front sections; and a cord system comprising at least three lengths of cord, two of said cord lengths suspending the respective side sections from a hook mounted to the ceiling or window of said vehicle by a double-triangular suspension defined by each of said two cord lengths being fixedly attached to two of said side section grommets and alternately threaded up through said hooks and down through another side section grommet, slidably passing through said hooks and said other side section grommet in a double-triangular configuration, and one length of cord suspending said front section from the seat headrests of said vehicle by a similar double triangular suspension, all three of said cords being adjustable in length by spring-detent cinches, whereby said liner is suspended at its periphery by said suspension-cord system attached along the windows or ceiling of the vehicle to thereby conform said liner to the entire cargo storage area.

* * * * *